Aug. 31, 1965   T. J. BROWN ETAL   3,203,049
MACHINES FOR VULCANIZING SOLES ONTO SHOE BOTTOMS
Filed July 10, 1962

Aug. 31, 1965   T. J. BROWN ETAL   3,203,049
MACHINES FOR VULCANIZING SOLES ONTO SHOE BOTTOMS
Filed July 10, 1962   4 Sheets-Sheet 3

United States Patent Office 3,203,049
Patented Aug. 31, 1965

---

3,203,049
MACHINES FOR VULCANIZING SOLES ONTO SHOE BOTTOMS
Terence John Brown, Raymond Derek Edwin Eldred, and William Alan North, Leicester, England, assignors to United Shoe Machinery Corporation, Flemington, N.J., a corporation of New Jersey
Filed July 10, 1962, Ser. No. 208,848
Claims priority, application Great Britain, July 29, 1961, 27,611/61
2 Claims. (Cl. 18—17)

This invention relates to molding machines and is herein illustrated in its application to machines for molding and attaching outsoles to shoe bottoms and curing or vulcanizing the outsole substance. Machines of this type are disclosed, for example, in United States Letters Patent No. 2,922,191, granted January 26, 1960, on an application filed in the name of George C. Barton, and in an application for United States Letters Patent Serial No. 177,857, filed March 6, 1962, in the names of Frank C. Choice et al. It is to be understood, however, that the invention is not limited to machines which perform both a molding and vulcanizing operation, but is applicable generally to machines for molding outsoles onto shoe bottoms.

It is an object of the present invention to provide an improved machine of the type illustrated in the Choice et al. application above referred to, and more particularly to provide a machine of this type which is adaptable to a plurality of molding procedures. Two sole molding procedures now practiced commercially are identified as the Cema process and the Ferrari process. In the practice of the Cema process a lasted shoe on a shoe form is advanced into a molding station while the side mold members are at least partially open, and the welt plates carried by the side mold members are impressed into the substance of the outer portion of the upper as the side mold members complete their closing movement. In the Ferrari process the side mold members complete their closing movement while the shoe form is still out of the molding station, and in this case the shoe form comes to rest in the molding station with the bottom margin of a lasted shoe on the shoe form bearing against the upper surfaces of the welt plates or lips or other structure provided in the side mold members to receive the bottom margin of the shoe in mold closing relation.

It is a still further object of the present invention to provide a machine of the type above referred to adapted to be used alternatively in the practice of the Cema process and the Ferrari process.

With the above and other objects in view as will hereinafter appear, the present invention is one aspect thereof contemplates the provision in a machine for molding soles onto shoe bottoms having a carrier for a shoe form and means mounting the carrier for movement to transfer a lasted shoe on the form between an intermediate station and a molding station of means for suspending the shoe form from the carrier so as to permit limited adjustment of the shoe form freely relatively to the carrier in the practice of the Cema process and means for immovably securing the shoe form in predetermined relation to the carrier to adapt the machine to the practice of the Ferrari process.

In the practice of the Cema process the shoe form is advanced from its intermediate station to its molding station by an actuator operating during the closing of the side mold members. In the practice of the Ferrari process the actuator remains inoperative during the closing of the side mold members so that the side mold members complete their closing movement with the shoe form in its intermediate station. To that end, and in accordance with a feature of the invention, means for operating the actuator is constructed and arranged for shifting movement between an operative position and an inoperative position, and suitable means is provided for yieldingly retaining said operating means in either of its positions.

In accordance with a further feature of the invention the means for operating the actuator for moving the shoe form carrier from its intermediate station to its molding station also serves to operate means for causing the actuation of the bottom mold member thus insuring the presence of the shoe form in the molding station before upward movement of the bottom mold member is initiated.

The invention will now be described with reference to the accompanying drawings and pointed out in the appended claims.

Figure 1:
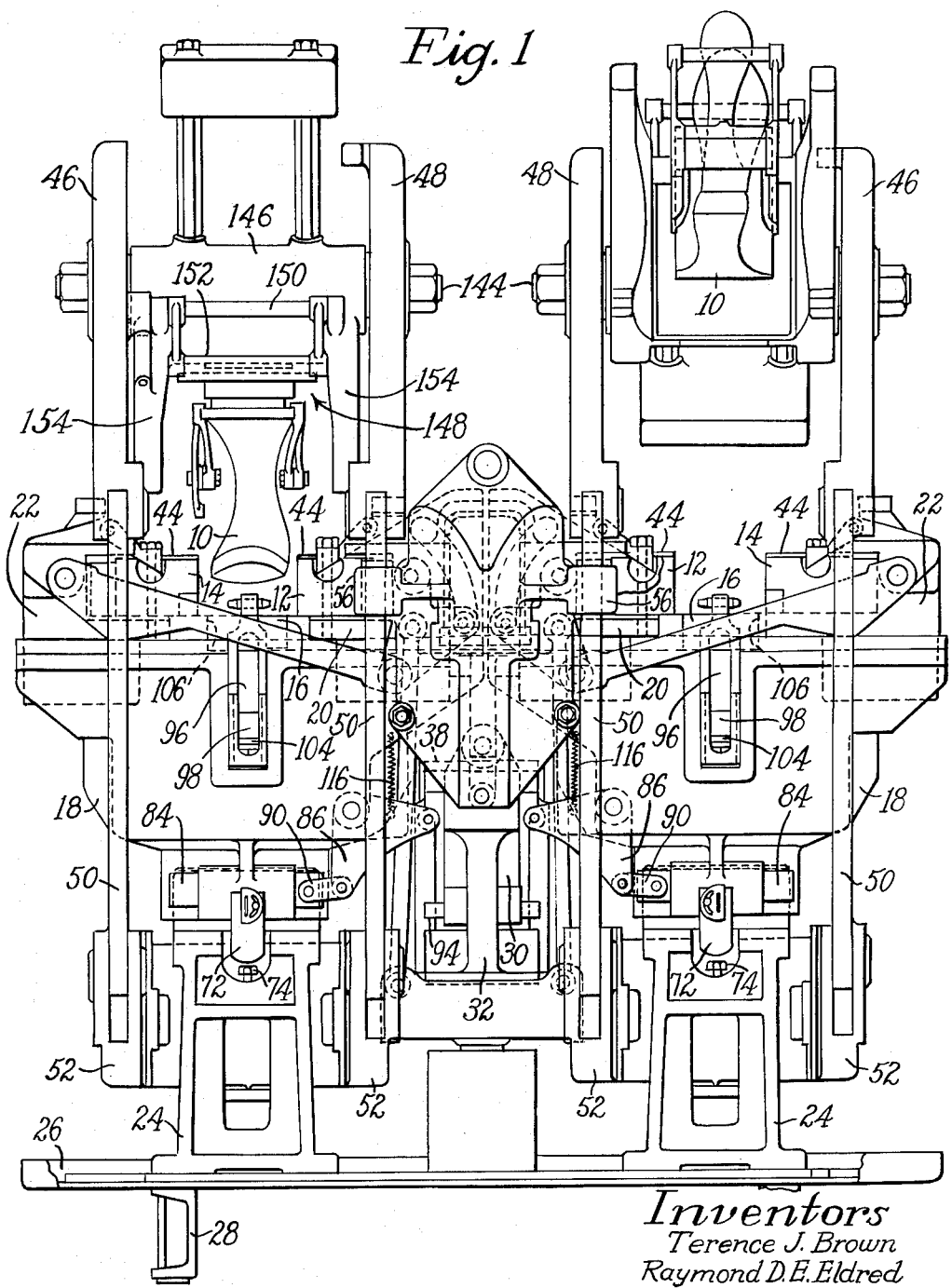
FIG. 1 is a front elevation illustrating a two-station machine embodying the features of the present invention.

Referring to FIG. 1, the invention is illustrated as embodied in a machine of the type illustrated, for example, in the pending application for United States Letters Patent of Frank C. Choice et al. hereinbefore referred to. The Choice et al. application discloses a two-station machine for vulcanizing soles onto shoe bottoms having in each station a shoe form 10 on which a lasted shoe upper is mounted preparatory to the molding or vulcanizing of an outsole thereon. The mold elements comprise the shoe form above referred to, an inner side mold member 12, an outer side mold member 14 and a bottom mold member 16 against which the side mold members close to define the mold cavity. The bottom mold member is constructed and arranged to move upwardly between the side mold members to apply pressure to the charge in the mold cavity during the molding or vulcanizing operation.

Each bottom mold member is positioned above a fixed hollow frame 18 having the shape of a relatively deep basin. The frame 18 provides support for an inner side mold carrier 20 and an outer side mold carrier 22, said carriers being mounted for sliding movement toward and from each other widthwise of the machine. Each frame 18 is mounted on standards 24, there being two such standards for supporting each of the frames. Each standard is secured to a horizontal base plate 26 which extends the full width of the machine, said base plate being supported on channel iron members 28 which rest on the floor.

In common with the machine disclosed in the Choice et al. application above referred to, the illustrated machine has a hydraulically operated piston and cylinder assembly in which the cylinder 30 has forwardly and rearwardly extending wings 32 which mount mechanism hereinafter described. The cylinder 30 is slidably mounted on a fixed vertical piston 34 having a downwardly extending piston rod 36. The piston divides the cylinder into an upper chamber and a lower chamber and the cylinder is elevated to perform functions hereinafter described by pressurizing its upper chamber and for this purpose a suitable port is provided in an upper end cap 38 of the cylinder. During the upward movement of the cylinder, oil in the lower chamber of the cylinder is exhausted through suitable ports and passages in the piston rod 36.

In practicing the Cema process above described the illustrated machine is provided with side mold members each of which has secured to its upper surface a welt plate 44 which extends inwardly slightly beyond the inner face of the mold member and engages a shoe upper on the form 10 along a line which registers substantially with the center of the edge face of an insole to which the upper is lasted. The upper surface of each mold member, and the welt plate 44 secured thereto, as seen in side elevation have a curved shape corresponding to the profile of the sole face of the shoe form 10, and the edge faces of the welt plates are shaped to define the peripheral contour of that portion of the upper which they engage. The edges of the welt plates impress the upper with sufficient force to provide a seal against spewing of a fluid charge in the mold cavity between the upper and the edges of the welt plates.

Referring to FIG. 1, each shoe form assembly is pivotally supported betwen an outer side frame 46 and an inner side frame 48, the upper portions of said side frames being arcuate in shape and arranged to extend upwardly relatively to the shoe form assembly. The side frames are arranged in parallel vertical planes extending from the front to the rear of the machine at opposite sides of the shoe form in each station of the machine. Each side frame is pivotally mounted at its forward extremity on the upper end portion of a vertical shaft 50 and its its rear extremity on the upper end portion of a similar shaft (not shown). The lower end portions of the shafts 50 are pivotally connected to opposite ends of cross heads 52 extending from front to back of the machine, there being four such cross heads, one associated with each pair of shafts 50. The two cross heads in each station of the machine are rigidly secured to opposite portions of side structures formed in a cylinder 54 (FIG. 2) extending heightwise of the machine and located between the standards 24. The innermost of the shafts 50 are held against swinging movement upon their pivotal connections with the cross heads 52 by their bearings in the cylinder heads of lugs 56 projecting from the frames 18.

To provide for the elevation of the shoe form from its molding or vulcanizing station each cylinder 54 has secured to its lower extremity an end cap or head 58 (FIG. 2) which is axially bored to provide a cylinder 60. Mounted in the cylinder is a piston 62 having a rod 64 extending downwardly and incorporated in a base member 66 fixed to the base plate 26. Mounted in each cylinder 54 is a piston 68 having a rod 70 extending upwardly therefrom through a bushing 110 supported by the hollow frame 18, said rod having at its upper extremity means for mounting the bottom mold member 16. When there is no pressure in the hydraulic system each cylinder 54 is supported at the limit of its downward movement by the engagement of lugs 72 (FIG. 1) fixed to the cylinder with the heads of abutment screws 74 mounted in the standards 24. When the hydraulic system is pressurized each cylinder 54 is elevated by pressure fluid supplied to the cylinder 60 through an axial bore 76 (FIG. 2) in the piston 62. The elevation of each cylinder raises the side frames 46 and 48 and the shoe form 10 supported thereby and supports the shoe form in an intermediate station in which it is elevated above its molding or vulcanizing station approximately $9/32$ of an inch. In this position the shoe form may be swung forwardly and upwardly into its loading station for the reception of a lasted shoe onto which a sole is to be vulcanized. After the lasted shoe is mounted on the shoe form the form is swung downwardly from its loading station into its intermediate station preparatory to the initiation of the hydraulic cycle of the machine.

In the practice of the Cema process each shoe form is required to move downwardly into its vulcanizing station before the side mold members complete their movement toward each other into their mutually closed position. To this end, means is provided for moving each cylinder 54 downwardly during the closing movement of the side mold members 12 and 14, such downward movement of the cylinders being completed before the side mold members come to rest in their mutually closed position. Downward movement of each cylinder is effected by horizontal movement of a pair of actuators herein illustrated as cam members 84 constructed and arranged to act on a pair of cam rolls 78 mounted at opposite sides of the cylinder. Each cam roll is mounted on an eccentric pin 80 which is adjustable to vary the position of the shoe form in the vulcanizing station. Each cam member 84 is mounted for horizontal sliding movement in a suitable bore formed in an extension of the hollow frame 18. At the initiation of the hydraulic cycle of the four cam members 84 are so positioned relatively to the cam rolls 78 that the cylinders 54 are at the limit of their upward movement and the shoe forms are positioned in their intermediate stations. The cam faces 82 are so constructed that movement of the cam member 84 in FIG. 2 to the right as seen in said figure and a corresponding movement of the other three cam members impart downward movements to the cylinders 54 thus causing the shoe forms to move downwardly from their intermediate stations to their vulcanizing stations. In the illustrated machine the movement of the shoe forms by the cam members is approximately $5/32$ of an inch. The machine is so organized that the four cam members operate concomitantly to cause the two shoe forms to move downwardly simultaneously from their intermediate stations to their vulcanizing stations. For actuating the cam members four bell crank levers 86 are each mounted on a fixed fulcrum 88 in the hollow frame 18 and connected to its cam member by a link 90. The horizontal arm of the bell crank lever is bifurcated to mount a roll 92. In the operation of the machine each roll 92 is engaged by an actuator herein illustrated as a horizontal crosspin 94 mounted to move vertically with the cylinder 30. In the practice of the Cema process each crosspin 94 is arranged to engage rolls 92 during the upward movement of the cylinder 30 thus causing the bell crank levers to actuate the cam members 84 thereby to move the shoe forms downwardly from their intermediate stations into their vulcanizing stations in the course of the closing movements of the side mold members 12 and 14.

After the cam members 84 have completed their operations and the side mold members have been fully advanced to bring the welt plates into engagement with lasted shoes on the shoe forms, each shoe form will receive an additional downward movement of not more than $1/8$ of an inch when oil is exhausted from the cylinder 60. The extent of such additional downward movement of the shoe form is determined by the engagement of the lower extremities of legs 154 (FIG. 1) in the shoe form supporting assemblies with the upper surfaces of the side mold carriers. The construction and arrangement of the legs 154 are further described hereinafter. Since the side mold members are fully advanced prior to such additional downward movement of each shoe form the welt plates impede downward movement of the lasted shoe mounted on the form so that the form moves downwardly relatively to the lasted shoe thereon to take up any space existing between the bottom of the form and the foot contacting surface of the insole.

Upon the completion of such additional downward movement of the shoe forms the bottom mold member 16 in each station of the machine is moved upwardly by the operation of the piston 68 (FIG. 2) thereby to mold the charge in the mold cavity into a sole shape and to press it against the bottom of the lasted shoe, such pressure being maintained until the termination of the molding or vulcanizing cycle. If desired, the vulcanizing cycle may be accelerated by the transmission of heat to the shoe forms.

Each bottom mold member is assembled with a base member or block 96 (FIG. 1) which is removable from the machine with the mold member for the substitution of another bottom mold assembly of a different size or style. The removable unit is mounted on a heated block 98 supported by a carrier member 100 (FIG. 2) secured to the reduced upper end of the piston rod 70 by clamping nuts 102, the heated block 98 being separated from the carrier 100 by an insulating plate 104.

Upward movement of each piston 68 moves the bottom mold member 16 upwardly through suitable retainer members 106 supported by the forward and rearward walls of the hollow frame 18 and received in the lower portion of the cavity formed by the inner walls of the side mold members 12 and 14. The retainer members prevent misplacement of the charge on the bottom mold member 16.

Figure 2:
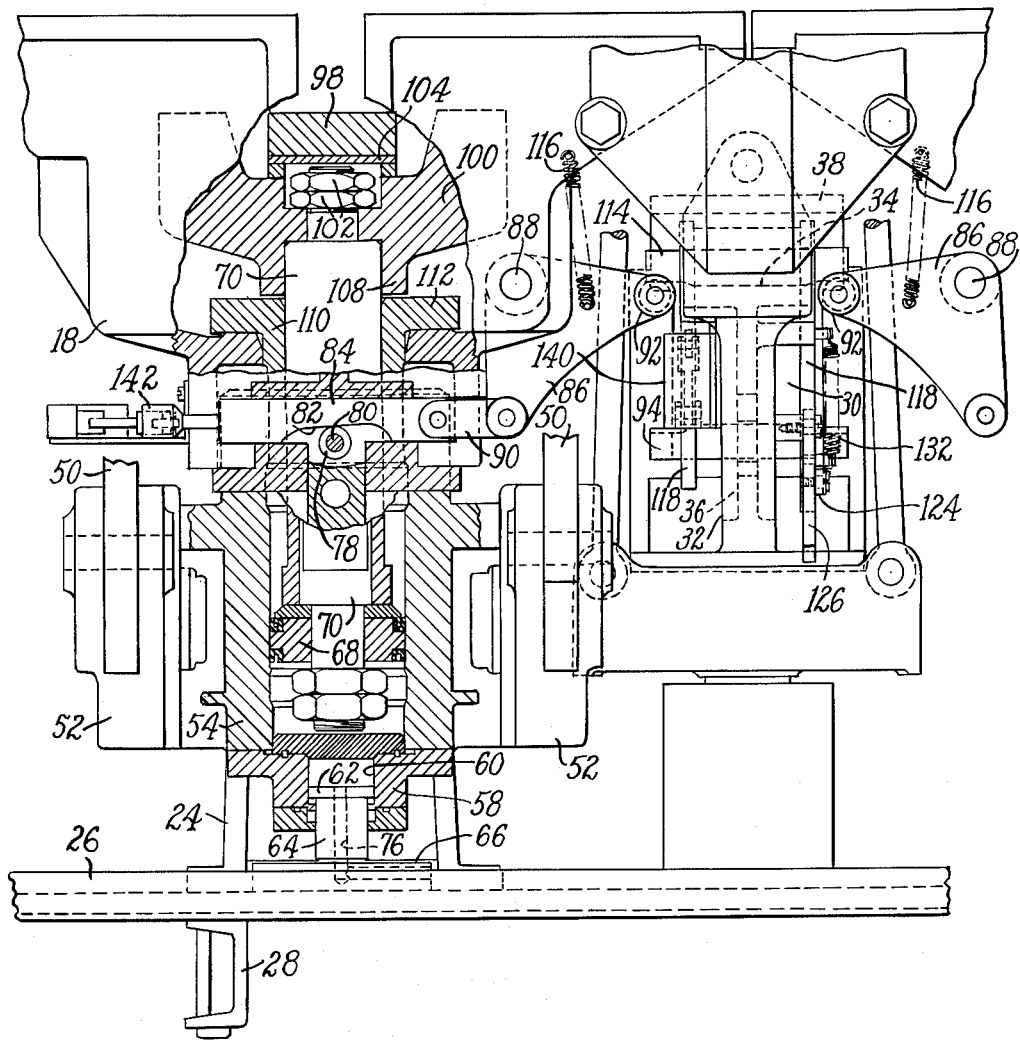
FIG. 2 is an enlarged view in front elevation partly in section illustrating features of the mechanism for actuating the shoe form and the mold members in the left station of the machine.

Upon the completion of the vulcanizing cycle pressure fluid in the upper portion of the cylinder 54 forces the piston 68 downwardly to a limit determined by the engagement of a cylindrical extension or foot 108 formed in the carrier 100 with the flanged upper extremity of the bushing 110 mounted in the cylinder 54, said bushing being supported by the engagement of its outwardly extending flange 112 with the base of the hollow frame 18. After an initial downward movement of the bottom mold member 16 pressure fluid beneath the piston 34 causes the cylinder 30 to move downwardly thereby to retract the side mold members 12 and 14. When the welt plates of the side mold members have moved beyond the newly molded shoe sole, crosspins 114 projecting in opposite directions from the upper portion of the cylinder 30 engage the rolls 92 and swing the bell crank levers against the tension of springs 116 thereby moving the cam members 84 outwardly or to the left as seen in FIG. 2, in order to permit upward movement of the cylinder 54 by fluid pressure in the cylinder 60, thus elevating the shoe form 10 from its vulcanizing station to its intermediate station. During the first stage of the downward movement of the cylinders 30 the crosspins 94 move out of engagement with the rolls 92 but the springs 116 hold the bell crank levers 86 against movement and thus hold the cam members 84 at the limit of their advancement and this position of the bell crank levers is maintained until the crosspins 114 engage the rolls 92 and positively swing the bell crank levers, this occurring, as above described, after the welt plates of the side mold members have been retracted into a position in which they are clear of the newly molded sole. It will be understood that such timing of the operation of the cam members 84 is necessary to obviate possible rupture of the bond between the sole and the shoe bottom by upward movement of the shoe form before the welt plates are clear of the margin of the newly molded sole.

When the illustrated machine is to be used in the practice of the Ferrari process above described, the side mold members 12 and 14 are closed against the bottom mold member 16 before the shoe form 10 moves downwardly into its vulcanizing station. For use in the Ferrari process, side mold members with welt plates attached thereto may be used if desired or, alternatively, side mold members having integral lips defining the peripheral contour of the shoe may be employed.

Figure 3:
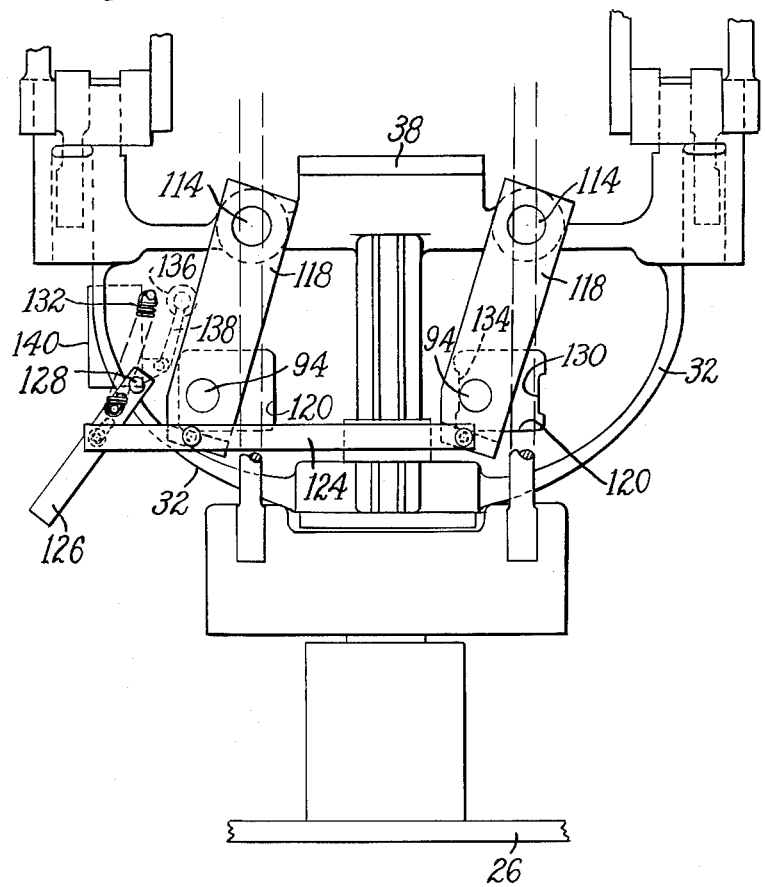
FIG. 3 is a right side elevation illustrating parts of the mechanism shown in FIG. 2.

In practicing the Ferrari process the side mold members are closed by upward movement of the cylinder 30 as hereinbefore described, but in this case the crosspins 94 are retracted into a position in which they bypass the rolls 92 during their upward movement thus permitting the side mold members to complete their closing movement while the shoe form remains in its intermediate station. To provide for such retraction of each crosspin 94 it is fixed in the lower end portions of a pair of arms 118 (FIG. 3) mounted on the crosspins 114. The crosspins 94 extend widthwise of the machine through clearance openings 120 formed in the wings 32 extending radially from the cylinder 30 and the extremities of the crosspin 94 project outwardly from the arms so as to engage the rolls 92 during upward movement of the cylinder 30. The lower end portions of the arms 118 at the right side of the cylinder 30 are connected by a horizontal link 124 in order to provide for the shifting of the crosspins 94 into their inoperative positions illustrated in FIG. 3. It will be understood that the shifting of the arms 118 at the right side of the cylinder 30 will cause movement in unison of the entire assembly including the arms 118 (FIG. 2) at the left side of the cylinder 30. Referring to FIG. 3, the link 124 is extended forwardly to provide for the pin and slot connection thereto of a shifting means herein illustrated as a hand lever 126 which is fulcrumed at 128 on the wing 32 extending forwardly from the cylinder 30. When the hand lever 126 is swung rearwardly to bring the crosspins 94 into their operating positions the rearmost of said crosspins engages a stop 130 formed in the rearwardly extending wing 32 thereby positioning the crosspins in vertical alinement with the rolls 92. The crosspins 94 are held in this position by a retaining means herein illustrated as a tension spring 132 anchored at its lower end to the hand lever 126 and at its upper end to the forwardly extending wing 32.

When the machine is to be used in the practice of the Ferrari process the hand lever 126 is swung forwardly into its position illustrated in FIG. 3 thereby to shift the crosspins 94 into their inoperative positions in which they will bypass the rolls 92 during the upward movement of the cylinder 30, thus permitting the side mold members 12 and 14 to complete their closing movement while the shoe form 10 remains in its intermediate station. The retracted or inoperative position of the crosspins 94 is determined by the engagement of the rearmost of said pins with an abutment surface 134 formed in the forward wall of the opening 120 in the rearwardly extending wing 32. The transfer of the crosspins 94 into their inoperative position is effected by forward movement of the hand lever 126, such movement of the hand lever carrying it beyond the dead center position of the spring 132 and into its position shown in FIG. 3 in which it is held against return movement by said spring.

When the machine is adjusted for use in the practice of the Ferrari process the lower portion of the cylinder 54 is pressurized immediately after the closing of the side mold members, thus causing downward movement of the cylinder and the shoe form 10 to bring the shoe form into its vulcanizing station. In this case the vulcanizing station of the shoe form is determined by the engagement of the bottom margin of a lasted shoe upper on the form with the welt plates or lips incorporated in the side mold members. During such downward movement of the cylinder 54 the piston 68, and consequently the bottom mold member, is held against upward movement by preventing the flow of fluid from that portion of the cylinder above the piston 68. By closing this portion of the cylinder to the flow of fluid, fluid is trapped between the piston 68 and the lower extremity of the bushing 110 thus preventing upward movement of the piston without restricting vertical movement of the cylinder 54. In the illustrated machine the prevention of the egress of fluid from the upper portion of the cylinder 54 is accomplished by the provision of a stopcock (not shown) in a line communicating with the upper portion of the cylinder. This stopcock is closed by the forward movement of the forward arm 118 at the left side of the forward wing 32. As shown in FIG. 3 said arm engages a roll 136 at the free end of a lever 138 fulcrumed on the housing of a microswitch 140 secured to the forwardly extending wing 32. The operation of the lever 138 by the forward movement of the arm 118 closes the microswitch thereby energizing a solenoid which operates the stopcock above referred to to close the line to the upper portion of the cylinder 54, thus holding the piston 68 against upward movement and preventing the elevation of the bottom mold member 16. Concomitantly with the downward movement of the cylinder 54 the spring 116 operates the bell crank lever 86 to shift the cam member 84 to the right as seen in FIG. 2. Such movement of the cam member causes the opening of a switch 142 in the circuit of the solenoid which operates the stopcock thereby de-energizing said solenoid and permitting a spring incorporated therein to open the stopcock, thus permitting fluid in the upper portion of the cylinder 54 to be exhausted. Pressure in the lower portion of the cylinder now moves the piston 68 upwardly thus elevating the bottom mold member 16 to cause it to apply vulcanizing pressure to a charge in the mold cavity. It will be understood that when the hand lever 126 is swung rearwardly to adjust the crosspins 94 for the practice of the Cema process the microswitch 140 remains open and consequently the stopcock above referred to remains inoperative.

To provide for the mounting of a shoe form for movement from the loading station to the intermediate station and from the intermediate station to the vulcanizing station the illustrated machine is provided with an organization generally similar to that provided in the Choice et al application hereinbefore referred to. The illustrated organization is mounted on a tie rod 144 interconnecting the side frames 46 and 48 and providing a shaft on which the shoe form supporting assembly swings to transfer a shoe form between its loading station and its intermediate station. Journaled on the tie rod is a hub 146 of a shoe form carrier identified generally by the numeral 148. Mounted on a spindle 150 carried by the hub 146 is a handle 152 whereby the operator may manipulate the carrier to transfer the shoe form from station to station. Formed integrally with the hub 146 are four legs 154 which support and position the shoe form in the vulcanizing station by engagement with bosses extending upwardly from the side mold carriers 20 and 22. Formed integrally with the hub 146 is a carrier member 156 (FIG. 4) in which there are mounted two cooperating wedge members 157 and 158 which may be secured to the hub by a clamping bolt 160 and nut 162. In order to hold the bolt against turning when the nut 162 is tightened, a pin 224 (FIG. 4) extends upwardly from the head of the bolt into a suitable bore in the wedge member 158. Positioned under the wedge members is a plate 164 to which a shoe form may be removably secured. The plate 164 may be suspended from the wedge member 158 by bolts 166 which carry at opposite ends thereof hemispherical washers 168 and 170 which are located in suitable hemispherical counterbores provided therefor in the wedge members and in the plate 164. Suitable nuts 172 lock the bolts and the washers in their positions shown in FIG. 4. The bolts extend through oversized bores 174 which permit limited adjustive movement of the plate 164 relatively to the wedge member both longitudinally and laterally of a shoe form carried by the plate so that in the practice of the Cema process the shoe form may be adjusted by the engagement of the welt plates of the side mold members with a lasted shoe mounted on the form so as to bring the form into registration with the mold members.

Figure 5:
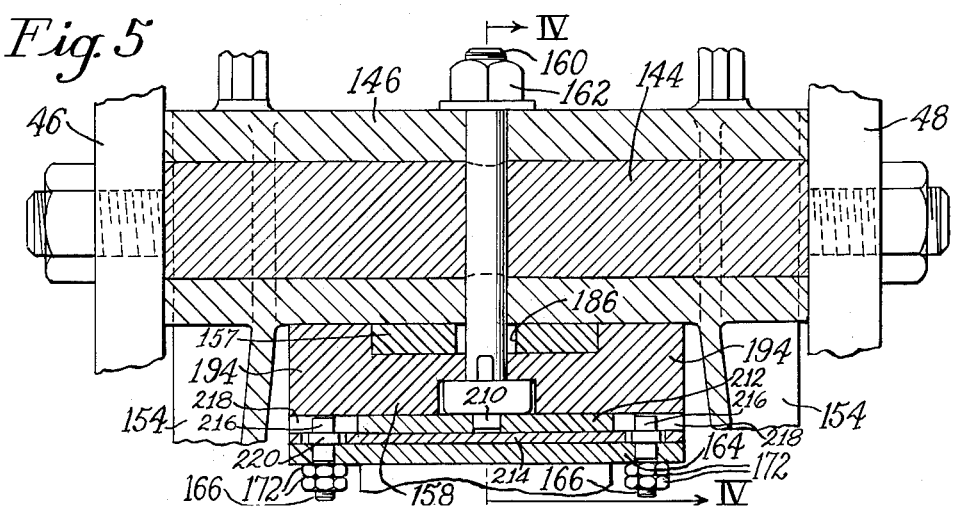
FIG. 5 is a section taken on the line V—V of FIG. 4.

In the practice of the Ferrari process the shoe form must be immovably secured to the carrier in predetermined relation to the seat provided by the closed side mold members. To that end the illustrated organization includes four bolts 176 which extend through the plate 164, the wedge members 157 and 158 and the carrier 156 and are provided at their upper ends with nuts 178 which are tightened to clamp the plate 164 against the wedge member 158 thereby to secure the shoe form in predetermined relation to the carrier. When it is desired to leave the shoe form free to be adjusted by the welt plates of the side mold members the nuts 178 are released sufficiently to permit shoulders 180 formed in the heads of the bolts to move downwardly out of the bores 182 provided therefor in the plate 164, thus permitting limited movement of the plate 164 relatively to the stems of the bolts. In order to prevent removal of the nuts 178 from the bolts 176, suitable cotter pins 184 are provided in the upper extremities of the bolts. To provide for vertical adjustment of the shoe form 10 the wedge 157 is constructed and arranged for adjustment horizontally relatively to the wedge 158, said wedge 157 having a longitudinal slot 186 formed therein to permit movement of the wedge relatively to the bolt 160. The wedge 157 is adjusted by turning a thumb screw 188 mounted in a threaded horizontal bore in the thick end portion of the wedge. The shank portion of the thumb screw is mounted in an open-ended vertical slot 190 formed in a plate 192 secured to side walls 194 (FIG. 5) of the wedge member 158. The thumb screw is held against horizontal movement by the engagement of a flange 196 formed in its shank portion with the inner surface of the plate 192 and by the engagement of a hub 198 of the handle 200 with the outer surface of the plate.

In adjusting the machine for the practice of the Ferrari process the operator backs off the nut 162 and the nuts 178 to permit the shoe form with a lasted shoe mounted thereon to move downwardly until the shoe comes to rest on the welt plates or the lips of the side mold members which for this purpose have been advanced into their closed position. The wedge member 157 is then adjusted by turning the thumb screw 188 to take up any space existing between the carrier member 156 and the wedge member, and the nut 162 and the nuts 178 are then tightened to secure the shoe form in fixed relation to the carrier member.

Figure 4:
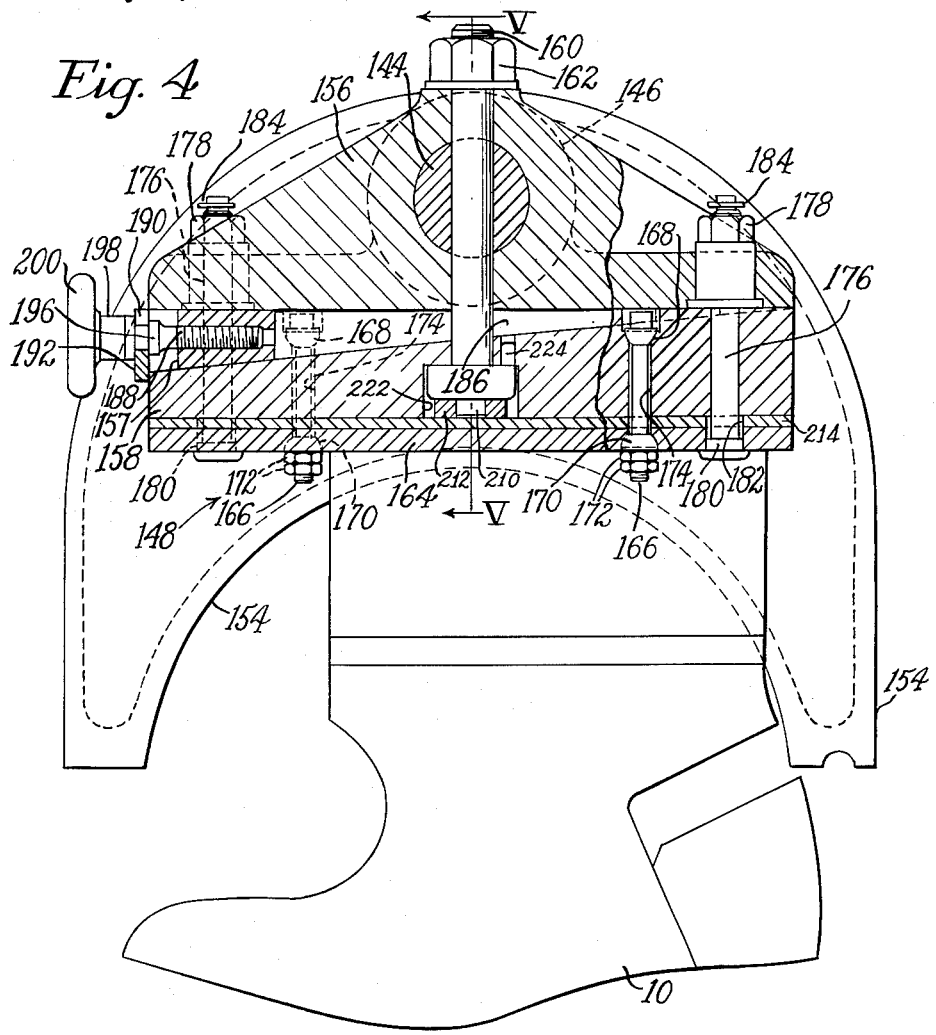
FIG. 4 is an enlarged view in right side elevation, partly in section on the line IV—IV of FIG. 5, illustrating a shoe form and its mounting mechanism.

Preparatory to the practice of the Cema process, the nuts 178 (FIG. 4) are slacked off to permit the bolts 176 to move downwardly until the shoulders 180 formed therein are clear of the bores 182 formed in the plate 164 and the shoe form 10 is supported by the bolts 166 for limited angular and lateral movements. During such angular and lateral movements the shoe form is held against longitudinal movement by a stud 210 extending axially downwardly from the head of the bolt 160 into a bore in the center of a plate 212 positioned between the head of the bolt and an insulating plate 214. The plate 164 which carries the shoe form has mounted therein, at opposite sides thereof, two pins 216 (FIG. 5) which extend upwardly into open ended slots 218 formed in the plate 212. The pins are held against downward movement by flanges 220 formed therein midway between their ends and arranged to engage the upper surface of the plate 164 through clearance openings in the insulating plate 214. As shown in FIG. 4, the plate 212 is supported upon the insulating plate 214 and positioned between the walls of a groove 222 formed in the wedge member, the width of the groove being sufficient to afford a limited angular movement of the plate 212 on the stud 210. It will be seen that the stud 210 acting through the plate 212 and the pins 216 holds the shoe form against longitudinal movement while permitting limited lateral and angular movements thereof.

Having thus described our invention, what we claim as new and desire to secure by Letters Patent of the United States is:

1. In a machine for molding soles onto shoe bottoms and having a carrier for a shoe form, a first means for moving the carrier from an intermediate station to a molding station, side mold members mounted in the molding station, and a second means for mutually closing the side mold members; means for selectively varying the sequence of operation of the said first and second means comprising means carried by the side mold closing means for operating the carrier moving means, and selective means for shifting said operating means between an operative and an inoperative position.

2. In a machine for molding soles onto shoe bottoms and having a carrier for a shoe form, a cam member for moving the carrier from an intermediate station to a molding station, side mold members mounted in the molding station, and an actuator for closing the side mold members; means for selectively varying the sequence of operation of said cam and said actuator comprising a member carried by the actuator and arranged to operate the cam member during the closing of the side mold members, and means for shifting said operating member between an operative and an inoperative position.

References Cited by the Examiner

UNITED STATES PATENTS

| | | | |
|---|---|---|---|
| 2,878,523 | 3/59 | Hardy. | |
| 2,973,553 | 3/61 | Turner | 18—17 |
| 3,016,569 | 1/62 | Bingham et al. | 18—17 |
| 3,018,517 | 1/62 | Ludwig | 18—17 |
| 3,058,152 | 10/62 | Eldred et al. | 18—17 |

WILLIAM J. STEPHENSON, *Primary Examiner.*

MICHAEL V. BRINDISI, *Examiner.*